US012628104B2

(12) United States Patent
Jiang et al.

(10) Patent No.: US 12,628,104 B2
(45) Date of Patent: May 12, 2026

(54) TIME-DOMAIN CORRELATION PROPERTY REPORTING METHOD AND APPARATUS

(71) Applicant: ZTE Corporation, Shenzhen (CN)

(72) Inventors: Guangyu Jiang, Shenzhen (CN); Bo Gao, Shenzhen (CN); Meng Mei, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 334 days.

(21) Appl. No.: 18/400,986

(22) Filed: Dec. 29, 2023

(65) Prior Publication Data

US 2024/0244554 A1 Jul. 18, 2024

Related U.S. Application Data

(63) Continuation of application No. PCT/CN2023/072728, filed on Jan. 17, 2023.

(51) Int. Cl.
*H04B 7/06* (2006.01)
*H04L 5/00* (2006.01)
*H04W 56/00* (2009.01)

(52) U.S. Cl.
CPC ........ *H04W 56/004* (2013.01); *H04B 7/0626* (2013.01); *H04L 5/0048* (2013.01)

(58) Field of Classification Search
CPC ... H04W 56/004; H04B 7/0626; H04L 5/0048
See application file for complete search history.

(56) References Cited

U.S. PATENT DOCUMENTS

| | | | |
|---|---|---|---|
| 2017/0222777 A1 | 8/2017 | Lee et al. | |
| 2019/0312623 A1* | 10/2019 | Park | H04B 7/06 |
| 2021/0050976 A1 | 2/2021 | Noh et al. | |
| 2022/0295297 A1 | 9/2022 | Li et al. | |
| 2023/0362702 A1* | 11/2023 | Lee | H04L 5/0051 |
| 2023/0396300 A1* | 12/2023 | Hindy | H04B 7/0481 |

(Continued)

FOREIGN PATENT DOCUMENTS

| | | |
|---|---|---|
| CN | 111385042 A | 7/2020 |
| CN | 111937457 A | 11/2020 |

(Continued)

OTHER PUBLICATIONS

Samsung et al., "Status Report to TSG," 3GPP TSG RAN Meeting #96, RP-221393, Budapest, Hungary, Jun. 6-9, 2022 (21 pages).

(Continued)

*Primary Examiner* — Michael J Moore, Jr.

(74) *Attorney, Agent, or Firm* — Perkins Coie LLP

(57) ABSTRACT

This document is directed to methods, systems, and devices related to wireless communication, and more specifically, to provide data transmission service for multiple users with different moving speeds. A method of wireless communication, comprising receiving, by a wireless communication device, a reference signal (RS); receiving, by the wireless communication device, a channel state information (CSI) reporting configuration signaling; determining, by the wireless communication device, according to the RS and the CSI reporting configuration signaling; and transmitting, by the wireless communication device, to a network device, a CSI according to the CSI reporting configuration signaling.

16 Claims, 7 Drawing Sheets

400

(56) References Cited

U.S. PATENT DOCUMENTS

| | | | | |
|---|---|---|---|---|
| 2024/0097765 A1* | 3/2024 | Mei | | H04L 5/0048 |
| 2024/0244554 A1* | 7/2024 | Jiang | | H04W 24/08 |
| 2025/0192845 A1* | 6/2025 | Sun | | H04B 7/065 |
| 2025/0226866 A1* | 7/2025 | Sahin | | H04B 7/0639 |
| 2025/0240072 A1* | 7/2025 | Canonne-Velasquez | | |
| | | | | H04B 7/0626 |
| 2025/0253908 A1* | 8/2025 | Irfan | | H04W 24/10 |

FOREIGN PATENT DOCUMENTS

| | | | |
|---|---|---|---|
| WO | 2020222602 A1 | 11/2020 | |
| WO | 2022235178 A1 | 11/2022 | |

OTHER PUBLICATIONS

Nokia, "CSI enhancement for high/medium UE velocities and CJT," 3GPP TSG RAN WG1 Meeting #109-e, R1-2204540, e-Meeting, May 9-20, 2022 (30 pages).

CATT, "On Rel-18 CSI enhancements," 3GPP TSG RAN WG1 #109-e, R1-2203443, e-Meeting, May 9-20, 2022 (10 pages).

Samsung (Moderator), "Moderator Summary#3 on Rel-18 CSI enhancements: Round 3," 3GPP TSG RAN WG1 #109-e, R1-2205362, e-Meeting, May 9-20, 2022 (22 pages).

Huawei et al., "CSI enhancement for coherent JT and mobility," 3GPP TSG-RAN WG1 Meeting #109-e, R1-2203151, e-Meeting, May 9-20, 2022 (18 pages).

Samsung (Moderator), "Moderator Summary on Rel-18 CSI enhancements," 3GPP TSG RAN WG1 #109-e, R1-2203889, e-Meeting, May 9-20, 2022 (21 pages).

International Search Report and Written Opinion for International Patent Application No. PCT/CN2023/072728, mailed Sep. 18, 2023 (10 pages).

Samsung, "Views on CSI enhancements," 3GPP TSG RAN WG1#109-e, R1-2203890, e-Meeting, May 9-May 20, 2022 (15 pages).

Japanese office action issued in JP Patent Application No. 2024-571244, dated Aug. 25, 2025, 8 pages. English translation included.

Google, "On CSI Enhancement," 3GPP TSG RAN WG1 #110bis-e, R1-2208872, e-Meeting, Oct. 10-19, 2022, 15 pages.

Canadian office action issued in CA Patent Application No. 3,258,336, dated Jan. 5, 2026, 7 pages.

European Search Report issued in EP Patent Application No. 23895651.0, dated Apr. 24, 2025, 10 pages.

ZTE, "CSI enhancement for high/medium UE velocities and CJT," 3GPP TSG RAN WG1 Meeting #111, R1-2210937, Toulouse, France, Nov. 14-18, 2022, 26 pages.

Japanese notice of allowance issued in JP Patent Application No. 2024-571244, dated Feb. 16, 2026, 4 pages. English translation included.

Ericsson, "On CSI enhancements for Rel-18 NR MIMO evolution," 3GPP TSG-RAN WG1 Meeting #110bis-e, R1-2209852, e-Meeting, Oct. 10-19, 2022, 41 pages.

* cited by examiner

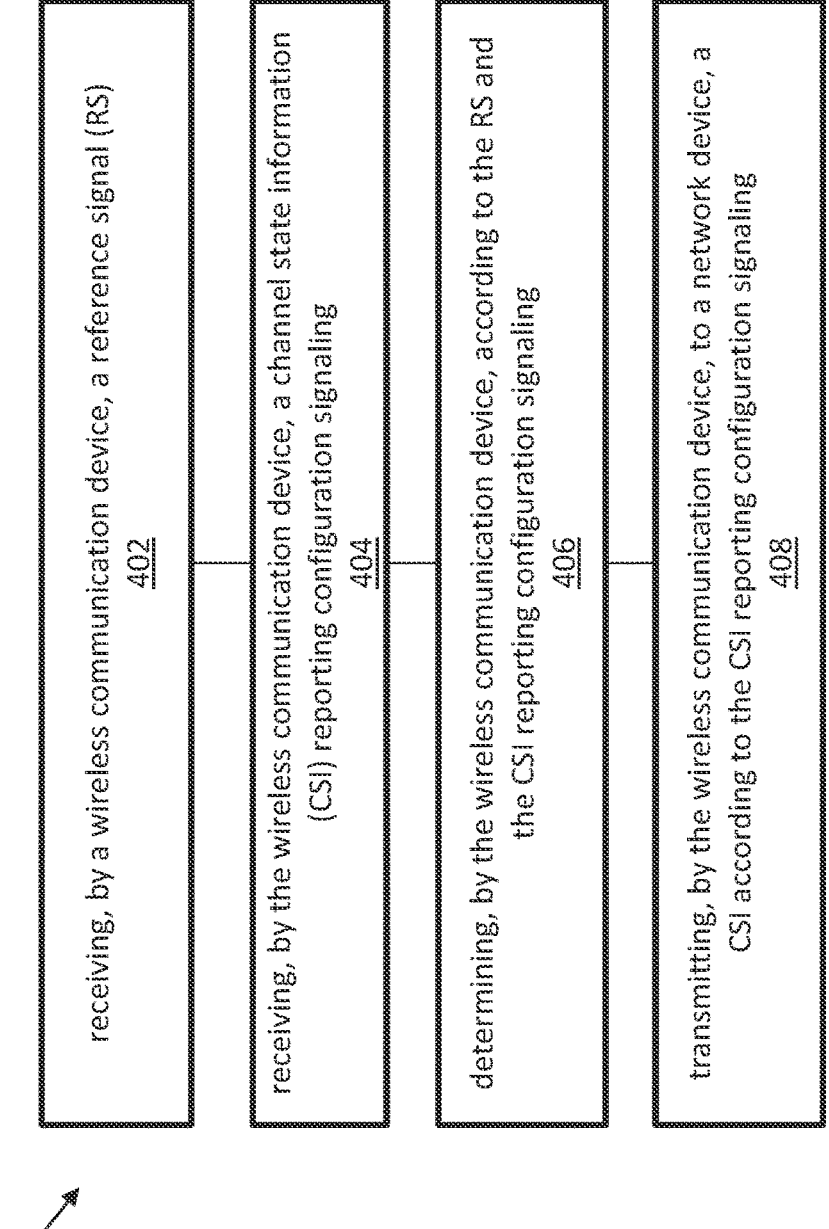

receiving, by a wireless communication device, a reference signal (RS)
402 receiving, by the wireless communication device, a channel state information (CSI) reporting configuration signaling
404 determining, by the wireless communication device, according to the RS and the CSI reporting configuration signaling
406 transmitting, by the wireless communication device, to a network device, a CSI according to the CSI reporting configuration signaling
408

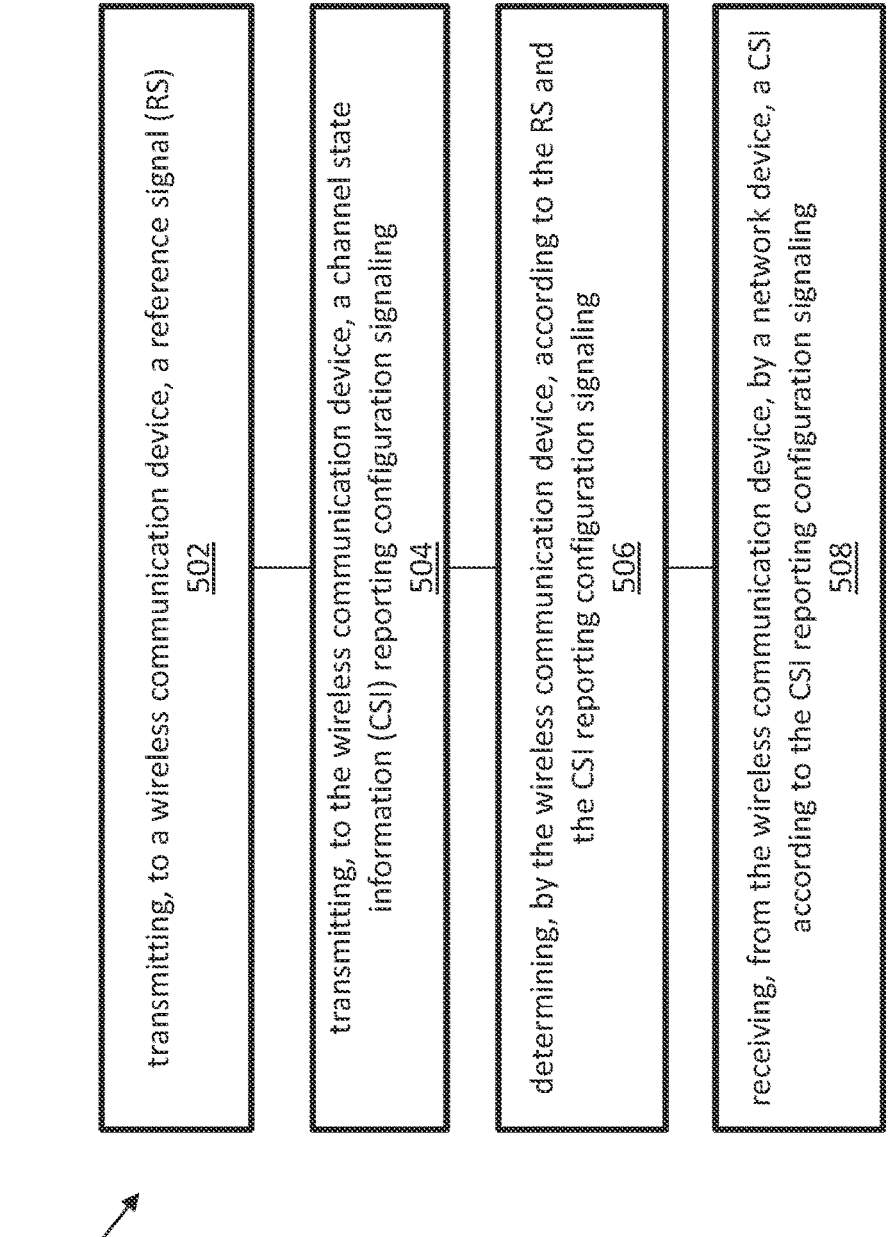

transmitting, to a wireless communication device, a reference signal (RS)
502 transmitting, to the wireless communication device, a channel state information (CSI) reporting configuration signaling
504 determining, by the wireless communication device, according to the RS and the CSI reporting configuration signaling
506 receiving, from the wireless communication device, by a network device, a CSI according to the CSI reporting configuration signaling
508

TIME-DOMAIN CORRELATION PROPERTY REPORTING METHOD AND APPARATUS

CROSS-REFERENCE TO RELATED APPLICATIONS

This application is a continuation of International Patent Application No. PCT/CN2023/072728, filed on Jan. 17, 2023, the contents of which are incorporated herein by reference in their entirety.

TECHNICAL FIELD

This disclosure is directed generally to wireless communications.

BACKGROUND

Wireless communication technologies are moving the world toward an increasingly connected and networked society. The rapid growth of wireless communications and advances in technology has led to greater demand for capacity and connectivity. Other aspects, such as energy consumption, device cost, spectral efficiency, and latency are also important to meeting the needs of various communication scenarios. In comparison with the existing wireless networks, next generation systems and wireless communication techniques need to provide support for an increased number of users and devices, as well as support an increasingly mobile society.

SUMMARY

Various techniques are disclosed that can be implemented by embodiments in mobile communication technology, including 5th Generation (5G), new radio (NR), 4th Generation (4G), and long-term evolution (LTE) communication systems.

In one example aspect, a wireless communication method is disclosed. The method includes receiving, by a wireless communication device, a reference signal (RS); receiving, by the wireless communication device, a channel state information (CSI) reporting configuration signaling; determining, by the wireless communication device, according to the RS and the CSI reporting configuration signaling; and transmitting, by the wireless communication device, to a network device, a CSI according to the CSI reporting configuration signaling.

In another example aspect, another wireless communication method is disclosed. The method includes transmitting, to a wireless communication device, a reference signal (RS); transmitting, to the wireless communication device, a channel state information (CSI) reporting configuration signaling; determining, by the wireless communication device, according to the RS and the CSI reporting configuration signaling; and receiving, from the wireless communication device, by a network device, a CSI according to the CSI reporting configuration signaling.

In yet another exemplary aspect, the above-described methods are embodied in the form of a computer-readable medium that stores processor-executable code for implementing the method.

In yet another exemplary embodiment, a device that is configured or operable to perform the above-described methods is disclosed. The device comprises a processor configured to implement the method.

The above and other aspects and their implementations are described in greater detail in the drawings, the descriptions, and the claims.

BRIEF DESCRIPTION OF THE DRAWINGS

FIG. 4 is a flowchart illustrating an example method.

FIG. 5 is a flowchart illustrating an example method.

DETAILED DESCRIPTION

Section headings are used in the present document only to improve readability and do not limit scope of the disclosed embodiments and techniques in each section to only that section. Certain features are described using the example of Fifth Generation (5G) wireless protocol. However, applicability of the disclosed techniques is not limited to only 5G wireless systems.

In many cases, a 5G base station (BS) has to provide data transmission service for multiple users with different moving speeds. Different moving speeds will lead to different channel changing speed between the users and the BS. To improve the service quality, the BS may acquire the time-domain correlation property (TDCP) of the channel and accordingly configures different service policies for different users. The TDCP may be measured by the user equipment (UE) and reported to the BS. The specific methods of TDCP reporting has not been determined yet and this document discloses several solutions to address the issue.

TDCP is one type of Channel State Information (CSI), which indicates the changing speed of the channel between UE and BS. TDCP is typically applied in two scenarios: the high-speed railway scenario and the expressway scenario.

Figure 1:
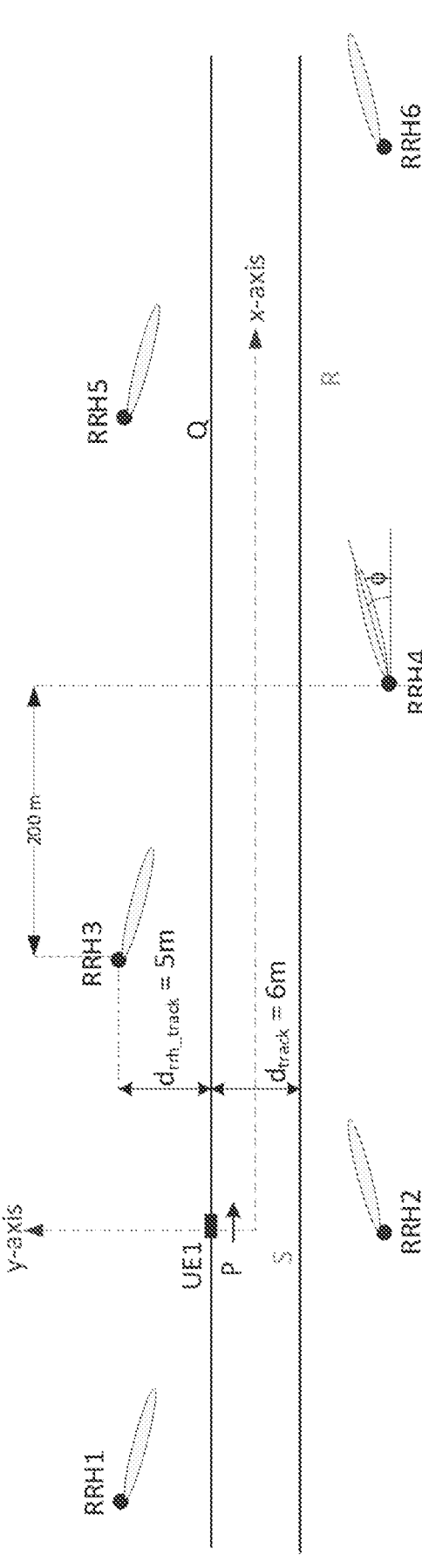
FIG. 1 illustrates an example of a high-speed railway scenario with multiple remote radio heads.

As shown in FIG. 1, the high-speed-railway scenario is illustrated where there are 6 Remote Radio Heads (RRH). In order to save handover procedure, some of RRHs correspond to the same cell. This means that there is a long narrow cell along with a railway. Similarly, there are several Transmission/Reception Points (TRP) deployed alone with an expressway.

Currently, two categories of properties are considered as alternatives of TDCP.

The first category is a time-domain property, i.e., a time-domain correlation of the channel. The channel correlation function c(τ) is defined as:

$$c(\tau) = \frac{\left| \sum_{n=0}^{N-1} h_n(t+\tau) \cdot h_n^*(t) \right|}{\sqrt{\sum_n |h_n(t+\tau)|^2} \sqrt{\sum_n |h_n(t)|^2}},$$

where $\tau$ denotes the lag, $h_n(t)$ denotes the channel response for sub carrier n at time instant t and is measured through the RS symbol at time instant t, and $(\bullet)^*$ denotes conjugate operation.

The second category is a doppler-domain property, i.e., a doppler shift or a doppler spread, which is extracted from a doppler spectrum. The doppler spectrum is a Discrete Fourier Transform (DFT) of discrete equispaced samples of c(τ), which can be expressed as: C(n)=DFT[c(n)], where C(n) denotes the doppler spectrum, c(n)=c(nΔτ) denotes a sample of c(τ) with Δτ denoting the sampling space, and DFT(•) denotes DFT operation.

Regardless of which categories of property is used, the specific solution of TDCP reporting has not yet been determined.

Explanations of certain terminologies used in the disclosure are defined as the following: in this document, "UE" is equivalent to wireless communication device, "BS" is equivalent to wireless network device, the next Generation Node B (gNB), or TRP, "Reference Signal (RS)" is equivalent to CSI-RS, RS for Tracking or Tracking RS (TRS), "CSI report configuration signaling" is equivalent to higher-level signaling, Radio Resource Control (RRC), Radio Resource Management (RRM), Radio Resource Arrangement (RRA), Downlink Control Information (DCI), or Physical Downlink Control CHannel (PDCCH), "TDCP" is equivalent to CSI, "time unit" can be sub-symbol, symbol, slot, subframe, frame, or transmission occasion, "channel correlation" is equivalent to channel auto-correlation, and channel correlation coefficient, "doppler spectrum" is defined as the circularly shifted DFT of channel correlations, wherein the zero-frequency component is located at the center of the spectrum, and "doppler shift" is defined as the frequency corresponding to a point in the doppler spectrum.

Embodiment 0: General Descriptions

Figure 2:
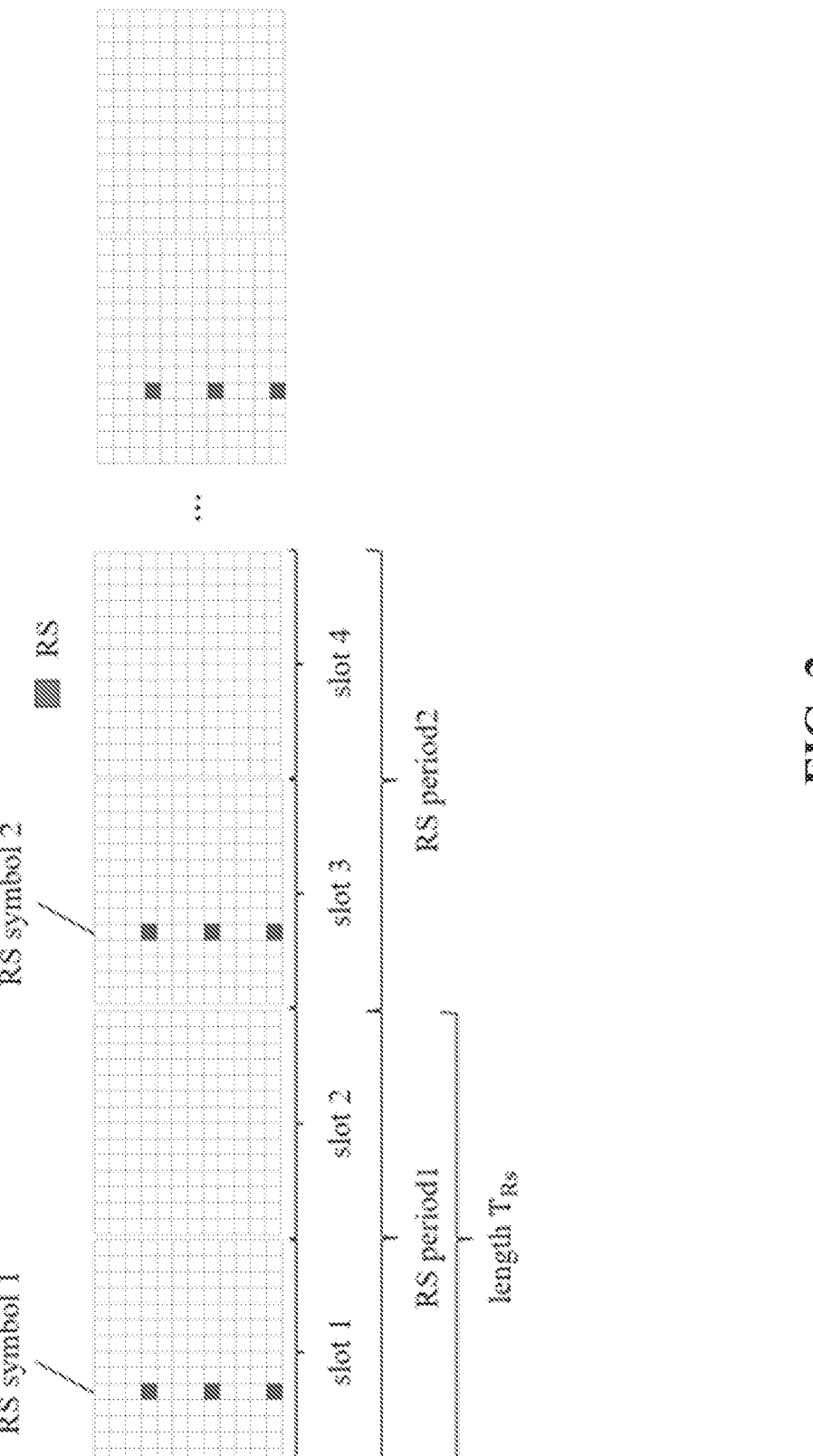
FIG. 2 illustrates an example of a time structure of reference signal.

The general procedure of UE reporting TDCP is as follows:

UE receives periodic RSs from BS, and the length of a RS period is $T_{RS}$ time unit. As illustrated in FIG. 2, the symbols with RS are denoted as RS symbols. In the example of FIG. 2, $T_{RS}$ is equal to 2 slots.

UE receives CSI reporting configuration signaling from BS;

UE determines TDCP according to the periodic RSs and CSI reporting configuration signaling; and UE reports TDCP to BS according to the CSI reporting configuration signaling.

Embodiment 1: UE reports a number of amplitudes of channel correlations, or a number of amplitudes and phases of channel correlations, as TDCP to BS If PhaseReportConfiguration is set as notConfigured, UE reports N amplitudes of channel correlations as TDCP to BS. N and PhaseReportConfiguration are parameters defined in CSI reporting configuration signaling, and N is an integer greater than or equal to 1.

The lags $\{\tau\}$ corresponding to the N amplitudes of channel correlations are determined according to the following expression: $\{\tau\}=\{T_s, 2\ T_s, \ldots, NT_s\}$, where $T_s$ is a parameter defined in CSI report configuration signaling, and $T_s$ is an integer multiple of the length of a RS period $T_{RS}$.

The amplitudes of channel correlations are measured through RS symbols within $(N+1)T_s$ consecutive time units.

For each lag t, the corresponding amplitude of channel correlation is measured as an average of measurements obtained through multiple pairs of RS symbols for which the temporal inter-symbol interval is equal to t.

UE should continuously receive RSs during the $(N+1)T_s$ consecutive time units.

If the timeRestictionConfiguration is set as notConfigured, where timeRestictionConfiguration is a parameter defined in CSI reporting configuration signaling, the $(N+1)T_s$ consecutive time units should be nearest before the time unit when UE is triggered for TDCP reporting.

If the timeRestictionConfiguration is set as Configured, where timeRestictionConfiguration is a parameter defined in CSI reporting configuration signaling, the $(N+1)T_s$ consecutive time units should be before the time unit when UE is triggered for TDCP reporting, meanwhile the temporal interval between the last time unit in the $(N+1)T_s$ consecutive time units and the time unit when UE is triggered for TDCP reporting is less than D time unit, where D is a parameter defined in CSI reporting configuration signaling, and D is an integer greater than or equal to 1.

UE reports the amplitudes of channel correlations in ascending order of their corresponding lags.

UE quantizes the amplitudes of channel correlations, and report the quantized amplitudes to BS.

For example: considering a case where PhaseReportConfiguration=notConfigured, N=4, $T_s$=2 slots, timeRestictionConfiguration=Configured, and D=5 slots, UE reports N=4 amplitudes of channel correlations with corresponding lags $\{\tau\}=\{2$ slots, 4 slots, 6 slots, 8 slots$\}$.

For each lag t, the corresponding amplitude of channel correlation is measured as an average of measurements obtained by all pairs of symbols, for which the temporal inter-symbol interval is equal to t, within $(N+1)T_s$=10 consecutive slots. The 10 consecutive slots are selected to be 2 slots before the slot when UE is triggered for TDCP reporting.

Assuming the N=4 amplitudes of channel correlations are measured as $\{0.8, 0.7, 0.5, 0.1\}$ and 3 bits are used to quantize each amplitude, UE would quantize the amplitudes as $\{0.875, 0.75, 0.5, 0.125\}$. Lastly, UE sequentially reports the quantized amplitudes $\{0.875, 0.75, 0.5, 0.125\}$ to BS.

If PhaseReportConfiguration is set as Configured, UE reports N amplitudes and M phases of channel correlations as TDCP to BS. N, M and PhaseReportConfiguration are parameters defined in CSI reporting configuration signaling, N and M are both integers greater than or equal to 1, and M≤N.

The lags $\{\tau\}$ corresponding to the N amplitudes of channel correlations are determined according to the following expression: $\{\tau\}=\{T_s, 2\ T_s, \ldots, NT_s\}$, where $T_s$ is a parameter defined in CSI report configuration signaling and $T_s$ is an integer multiple of the length of a RS period $T_{RS}$.

The lags $\{\tau\}$ corresponding to the M phases of channel correlations are determined according to the following expression: $\{1\}=\{T_s, 2\ T_s, \ldots, MT_s\}$.

The amplitudes and phases of channel correlations are measured through RS symbols within $(N+1)T_s$ consecutive time units.

For each lag τ, the corresponding amplitude or phase of channel correlation is measured as an average of measurements obtained by multiple pairs of RS symbols for which the temporal inter-symbol interval is equal to τ.

UE should continuously receive RSs during the $(N+1)T_s$ consecutive time units.

If the timeRestictionConfiguration is set as notConfigured, where timeRestictionConfiguration is a parameter defined in CSI reporting configuration signaling, the $(N+1)$ $T_s$ consecutive time units are selected to be nearest before the time unit when UE is triggered for TDCP reporting.

If the timeRestictionConfiguration is set as Configured, where timeRestictionConfiguration is a parameter defined in CSI reporting configuration signaling, the $(N+1)T_s$ consecutive time units should be before the time unit when UE is triggered for TDCP reporting, meanwhile the temporal interval between the last time unit in the $(N+1)T_s$ consecutive time units and the time unit when UE is triggered for TDCP reporting is less than D time unit, where D is a parameter defined in CSI reporting configuration signaling and D is an integer greater than or equal to 1.

UE reports the amplitudes of channel correlations first, then reports the phases of the channel correlations afterwards.

UE reports the amplitudes and phases of channel correlations in ascending order of their corresponding lags.

UE quantizes the amplitudes and phases of channel correlations, and report the quantized amplitudes and phases to BS.

For example: considering a case where PhaseReportConfiguration=notConfigured, N=4, M=2, $T_s$=2 slots, timeRestictionConfiguration=Configured, and D=5 slots, UE reports N=4 amplitudes of channel correlations with corresponding lags {$\tau$}={2 slots, 4 slots, 6 slots, 8 slots} and M=2 phases of channel correlations with corresponding lags {$\tau$}={2 slots, 4 slots}.

For each lag $\tau$, the corresponding amplitude or phase of channel correlation is measured as an average of measurements obtained by all pairs of symbols, for which the temporal inter-symbol interval is equal to $\tau$, within $(N+1)$ $T_s$=10 consecutive slots. The 10 consecutive slots are selected to be 2 slot before the slot when UE is triggered for TDCP reporting.

Assuming the N=4 amplitudes of channel correlations are measured as {0.8, 0.7, 0.5, 0.1}, M=2 phases of channel correlations are measured as $$\left\{\frac{\pi}{9}, \frac{\pi}{3}\right\},$$

and 3 bits are used to quantize each amplitude and phase, UE would quantize the amplitudes and phases as {0.875, 0.75, 0.5, 0.125} and $$\left\{\frac{\pi}{8}, \frac{3\pi}{8}\right\},$$

respectively. Lastly, UE firstly reports the quantized amplitudes {0.875, 0.75, 0.5, 0.125} in sequence, and secondly reports the quantized phases $$\left\{\frac{\pi}{8}, \frac{3\pi}{8}\right\}$$

in sequence.

Embodiment 2: UE Reports a Number of Real Parts of Channel Correlations as TDCP to BS.

UE reports N real parts of channel correlations as TDCP to BS, where N is a parameter defined in CSI reporting configuration signaling and N is an integer greater than or equal to 1.

The lags {$\tau$} corresponding to the N real parts of channel correlations are determined according to the following expression: {$\tau$}={$T_s$, 2 $T_s$, . . . , $NT_s$}, where $T_s$ is a parameter defined in CSI report configuration signaling and $T_s$ is an integer multiple of the length of a RS period $T_{RS}$.

The real parts of channel correlations are measured through RS symbols within $(N+1)T_s$ consecutive time units.

For each lag $\tau$, the corresponding real part of channel correlation is measured as an average of measurements obtained by multiple pairs of RS symbols for which the temporal inter-symbol interval is equal to $\tau$.

UE should continuously receive RS within the $(N+1)T_s$ consecutive time units.

If the timeRestictionConfiguration is set as notConfigured, where timeRestictionConfiguration is a parameter defined in CSI reporting configuration signaling, the $(N+1)$ $T_s$ consecutive time units are selected to be nearest before the time unit when UE is triggered for TDCP reporting.

If the timeRestictionConfiguration is set as Configured, where timeRestictionConfiguration is a parameter defined in CSI reporting configuration signaling, the $(N+1)T_s$ consecutive time units should be before the time unit when UE is triggered for TDCP reporting, meanwhile the temporal interval between the last time unit in the $(N+1)T_s$ consecutive time units and the time unit when UE is triggered for TDCP reporting is less than D time unit, where D is a parameter defined in CSI reporting configuration signaling and D is an integer greater than or equal to 1.

UE reports the real parts of channel correlations in ascending order of their corresponding lags.

UE quantizes the real parts of channel correlations, and report the quantized real parts to BS.

For example: considering a case N=4, $T_s$=2 slots, timeRestictionConfiguration=Configured, and D=5 slots, UE reports N=4 real parts of channel correlations with corresponding lags {$\tau$}={2 slots, 4 slots, 6 slots, 8 slots}.

For each lag $\tau$, the corresponding real part of channel correlation is measured as an average of measurements obtained by all pairs of symbols, for which the temporal inter-symbol interval is equal to $\tau$, within $(N+1)T_s$=10 consecutive slots. The 10 consecutive slots are selected to be 2 slot before the slot for when UE is triggered for TDCP reporting.

Assuming the N=4 real parts of channel correlations are measured as {0.8, 0.7, 0.5, 0.1} and 3 bits are used to quantize each real part, UE would quantize the real parts as {0.875, 0.75, 0.5, 0.125}, and finally reports the quantized real parts to BS.

Embodiment 3: UE Reports a Number of Differential Doppler Shifts Relative to a Reference Doppler Shift as TDCP to BS UE reports K−1 differential doppler shifts relative to a reference doppler shift as TDCP to BS, where K is a parameter defined in CSI reporting configuration signaling and K is an integer greater than or equal to 2.

The reference doppler shift is selected as the doppler shift corresponding to the maximum point in the doppler spectrum.

The differential doppler shift is computed according to the following expression: $\Delta f_{d,k}=f_{d,k}-f_{d,ref}$, for k=2, 3, . . . K, where $f_{d,k}$ is the doppler shift corresponding to the kth maximum point in the doppler spectrum, and $f_{d,ref}$ is the reference doppler shift.

UE computes the doppler spectrum through RSs within L consecutive RS periods, where L is a parameter defined in CSI reporting configuration signaling and L is an integer greater than or equal to 2.

If timeRestictionConfiguration is set as notConfigured, the L consecutive RS periods are selected to be nearest before the time unit for when UE is triggered for TDCP reporting, where timeRestrictionConfiguration is a parameter defined in CSI reporting configuration signaling.

If timeRestrictionConfiguration is set as Configured, the L consecutive RS periods should be before the time unit for when UE is triggered for TDCP reporting, and the temporal interval between the last time unit in the L consecutive RS periods and the time unit for when UE is triggered for TDCP reporting is less than D time unit. D is a parameter defined in CSI reporting configuration signaling, and D is an integer greater than or equal to 1.

UE reports the differential doppler shifts in a frequency unit defined as unit=$1/(L \cdot O \cdot T_{RS})$, where O is a parameter defined in CSI reporting configuration signaling, and O is a parameter greater than or equal to 1.

UE reports the differential doppler shifts $\Delta f_{d,k}$, k=2, 3, . . . , K in ascending order of the index k.

For example: considering a case when K=4, L=16, 0=1, D=5, $T_{RS}$=2 slots, and timeRestrictionConfiguration=Configured. UE computes the doppler spectrum through RS symbols within L=16 RS periods.

The L=16 RS periods are before the slot when UE is triggered for TDCP reporting, and the temporal interval between the last slot in the L=16 RS periods and the slot for when UE is triggered for TDCP reporting is 2 slots.

Figure 3:
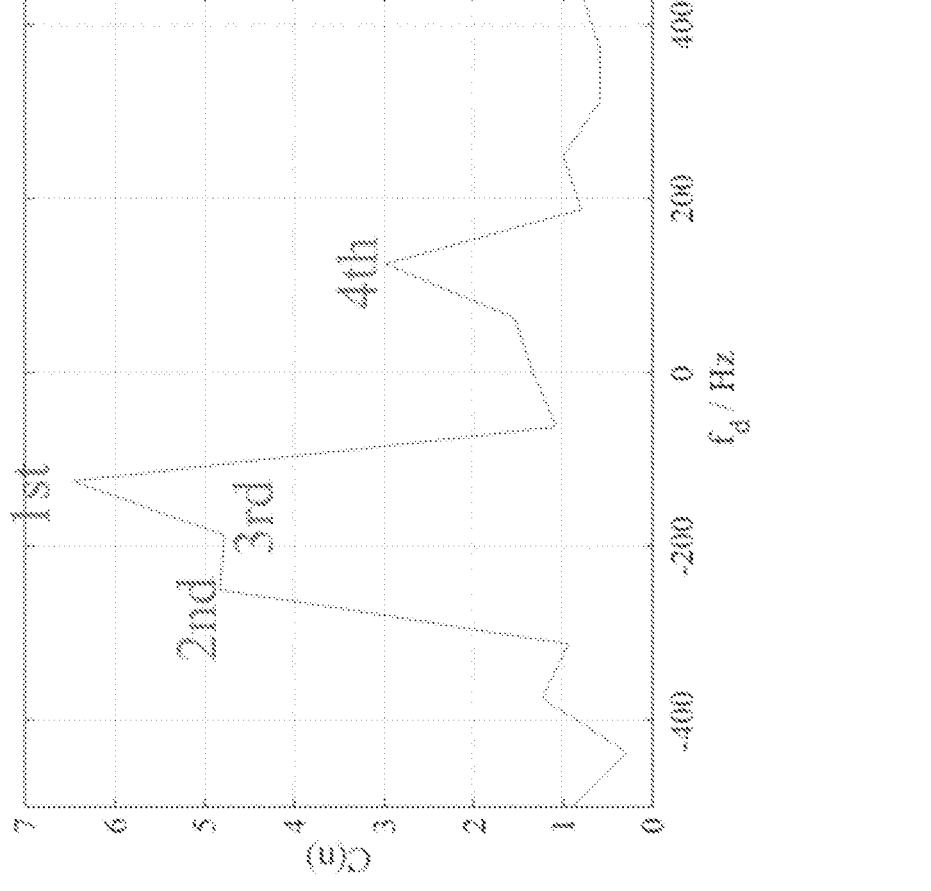
FIG. 3 illustrates an example of a doppler spectrum.

As shown in FIG. 3, the $1^{st}$ to $4^{th}$ maximum points are indicated in the computed doppler spectrum. The reference doppler shift is selected as the doppler shift corresponding to the $1^{st}$ maximum point. The differential doppler shifts are computed as −125 Hz, −62.5 Hz, and 187.5 Hz. The frequency unit is computed as 62.5 Hz. UE sequentially reports the differential doppler shifts in the frequency unit of 62.5 Hz as −2, −1, and 3.

Embodiment 4: UE Reports a Doppler Spread as TDCP to BS

UE reports a doppler shift, i.e., a difference between the doppler shifts corresponding to two points in the doppler spectrum as TDCP to BS.

UE computes the doppler spectrum through RSs within L consecutive RS periods, where L is a parameter defined in CSI reporting configuration signaling, and L is an integer greater than or equal to 2.

If timeRestictionConfiguration is set as notConfigured, the L consecutive RS periods are selected to be nearest before the time unit for when UE is triggered for TDCP reporting, where timeRestrictionConfiguration is a parameter defined in CSI reporting configuration signaling.

If timeRestrictionConfiguration is set as Configured, the L consecutive RS periods should be before the time unit for when UE is triggered for TDCP reporting, and the temporal interval between the last time unit in the L consecutive RS periods and the time unit for when UE is triggered for TDCP reporting is less than D time unit. D is a parameter defined in CSI reporting configuration signaling, and D is an integer greater than or equal to 1. The two points in the doppler spectrum are selected according to the following steps:

Step1: UE sorts the amplitudes of the Doppler spectrum {|C(n)|} in descending order. $f_{d,i}$ and $n_i$ denotes the Doppler shift and the DFT index corresponding to the ith maximum point in the Doppler spectrum, respectively.

Step2: UE computes the sum of the amplitudes of the first I maximum points in the Doppler spectrum, i.e., $S(I) = \sum_{i=1}^{I} |C(n_i)|.$ Then UE finds the minimum I that satisfies the condition $$S(I) \ge \alpha \sum_{n=0}^{N-1} |C(n)|,$$

where $0 < \alpha < 1$ is a threshold value. This specific I is denoted as $I_0$.

Step3: UE finds the minimum and maximum DFT indices $n_{min}$ and $n_{max}$ in the set $\{n_1, n_2, \ldots, n_{I_0}\}$. The points $C(n_{min})$ and $C(n_{max})$ are the two selected points.

UE reports the doppler spread in a frequency unit defined as: unit=$1/(L \cdot O \cdot T_{RS})$, where O is a parameter defined in CSI reporting configuration signaling, and O is a parameter greater than or equal to 1.

For example: considering a case when L=16, O=1, D=5, $T_{RS}$=2 slots, and timeRestrictionConfiguration=Configured. UE computes the doppler spectrum through RS symbols within L=16 RS periods.

The L=16 RS periods are before the slot for when UE is triggered for TDCP reporting, and the temporal interval between the last slot in the L=16 RS periods and the slot for when UE is triggered for TDCP reporting is 2 slots.

As shown in FIG. 3, the $1^{st}$ to $4^{th}$ maximum points are indicated in the computed doppler spectrum. The 2nd and $4^{th}$ maximum points are selected to compute the doppler spread. The doppler spread is computed as 312.5 Hz. The frequency unit is computed as 62.5 Hz. Lastly, UE reports the doppler spread in the frequency unit as 5.

Accordingly, some preferred embodiments may use the following solutions.

1. A method of wireless communication, as disclosed in FIG. 4: including receiving, by a wireless communication device, a reference signal (RS) (402); receiving, by the wireless communication device, a channel state information (CSI) reporting configuration signaling (404); determining, by the wireless communication device, according to the RS and the CSI reporting configuration signaling (406); and transmitting, by the wireless communication device, to a network device, a CSI according to the CSI reporting configuration signaling (408). Additional details and examples are discussed with respect to embodiments 0 & 1 and FIGS. 1 & 2.

2. The method of solution 1, wherein the RS further contains at least one of: a CSI-RS; or a tracking RS (TRS); wherein the length of the $T_{RS}$ period is represented as $T_{RS}$, wherein a unit of $T_{RS}$, is a time unit.

3. The method of solution 1 wherein the CSI reporting configuration signaling contains at least one of the parameter groups: a first parameter group; a second parameter group; a third parameter group; or a fourth parameter group.

4. The method of solution 3, wherein the first parameter group contains all of: a parameter PhaseReportConfiguration that can be set to Configured or notConfigured; a parameter TimeRestrictionConfiguration that can be set to Configured or notConfigured; a parameter N that is an integer greater than or equal to 1; a parameter M that is an integer greater than or equal to 1; wherein the M is less than or equal to the N; a parameter $T_s$ that is an integer multiple of $T_{RS}$; and a parameter D that is an integer greater than or equal to 1.

5. The method of solution 3, wherein the second parameter group contains all of: a parameter TimeRestrictionConfiguration that can be set to Configured or notConfigured; a parameter N that is an integer greater than or equal to 1; a parameter $T_s$ that is an integer multiple of $T_{RS}$; and a parameter D that is an integer greater than or equal to 1.

6. The method of solution 3, wherein the third parameter group contains all of: a parameter TimeRestrictionConfiguration that can be set to Configured or notConfigured; a parameter K that is an integer greater than or equal to 2; a parameter L that is an integer greater than or equal to 2; a parameter O that is an integer greater than or equal to 1; and a parameter D that is an integer greater than or equal to 1.

7. The method of solution 3, wherein the fourth parameter group contains all of: a parameter TimeRestrictionConfiguration that can be set to Configured or notConfigured; a parameter L that is an integer greater than or equal to 2; a parameter O that is an integer greater than or equal to 1; and a parameter D that is an integer greater than or equal to 1.

8. The method of solution 1, wherein the wireless communication device determines the CSI according to the CSI reporting configuration signaling contains at least one of: a time-domain property; or a doppler-domain property.

9. The method of solution 8, wherein the time-domain property contains at least one of: an amplitude of a channel correlation; wherein the PhaseReportConfiguration in the first parameter group is set to notConfigured; an amplitude and phase of a channel correlations; wherein the parameter PhaseReportConfiguration in the first parameter group is set to Configured; and a real part of a channel correlations.

10. The method of solution 9, wherein the wireless communication device determines a number of amplitudes of the channel correlation; and wherein the number of amplitudes associate with the parameter N in the first group.

11. The method of solution 9, wherein the wireless communication device determines a number of amplitudes and phases of the channel correlation; and wherein the number of amplitudes associate with the parameter N in the first group and the number of phases associated with the parameter M in the first group.

12. The method of solutions 10 and 11, wherein a lag $\{\tau\}$ corresponding to the N amplitudes of the channel correlations according to the following expression: $\{\tau\}=\{T_s, 2\,T_s, \ldots, NT_s\}$; wherein parameter $T_s$ is part of the first parameter group.

13. The method of solution 11, wherein a lag $\{\ \}$ corresponding to the M phases of the channel correlations according to the following expression: $\{\tau\}=\{T_s, 2\,T_s, \ldots, MT_s\}$; wherein parameter $T_s$ is part of the first parameter group.

14. The method of solutions 12 and 13, wherein the wireless communication device determines the number of amplitudes and phases the channel correlation according to a pair of RSs symbol within a $(N+1)T_s$ consecutive time units; wherein parameters N and $T_s$ are part of the first parameter group; determining, by the wireless communication device, a corresponding amplitude or amplitude and phase of the channel correlation for each lag $\tau$, wherein the wireless communication device further averages an measurement obtained by multiple pairs of RS symbols within the $(N+1)T_s$ consecutive time units; and wherein each pairs of RS symbols satisfy that an inter-symbol interval is equal to the lag $\tau$.

15. The method of solution 14, wherein the wireless communication device determines a temporal position of the $(N+1)T_s$ consecutive time units according to the parameters TimeRestrictionConfiguration and D of the first parameter group and according to the following rules: a first rule, wherein the wireless communication device receives a periodic RSs during the $(N+1)T_s$ consecutive time units continuously; a second rule, wherein when the parameter TimeRestrictionConfiguration is set to notConfiguredand and based on satisfying the first rule, the temporal position is determined such that: a last time unit of the $(N+1)T_s$ consecutive time units is nearest before the time unit for when the wireless communication device is trigger for time-domain correlation property (TDCP) reporting; and a third rule, wherein when the parameter TimeRestrictionConfiguration is set to Configured and based on satisfying the first rule, the temporal position is determined such that a last time unit of the $(N+1)T_s$ consecutive time units is before the time unit for when the wireless communication device is trigger for TDCP reporting, and further, the temporal interval between the last time unit of the $(N+1)T_s$ consecutive time units and the time unit for when the wireless communication device is trigger for TDCP reporting is less than D time units.

16. The method of solution 9, wherein the wireless communication device determines a number of real parts of the channel correlation; and wherein the number of real parts associate with the parameter N in the second group.

17. The method of solution 16, wherein a lag $\{\tau\}$ corresponding to the N real parts of the channel correlations according to the following expression: $\{\tau\}=\{T_s, 2\,T_s, \ldots, NT_s\}$; wherein parameter $T_s$ is part of the second parameter group.

18. The method of solution 17, wherein the wireless communication device determines the number of real parts the channel correlation according to a pair of RSs symbol for a $(N+1)T_s$ consecutive time units; wherein parameters N and $T_s$ are part of the second parameter group; determining, by the wireless communication device, a corresponding the real parts of the channel correlation for each lag $\tau$, wherein the wireless communication device further averages an measurement obtained by multiple pairs of RS symbols within the $(N+1)T_s$ consecutive time units; and wherein each pairs of RS symbols satisfy that an inter-symbol interval is equal to the lag $\tau$.

19. The method of solution 18, wherein the wireless communication device determines a temporal position of the $(N+1)T_s$ consecutive time units according to the parameters TimeRestrictionConfiguration and D of the second parameter group and according to the following rules: a first rule, wherein the wireless communication device receives a periodic RSs during the $(N+1)T_s$ consecutive time units continuously; a second rule, wherein when the parameter TimeRestrictionConfiguration is set to notConfigured and based on satisfying the first rule, the temporal position is determined such that: a last time unit of the $(N+1)T_s$ consecutive time units is nearest before the time unit for when the wireless communication device is trigger for time-domain correlation property (TDCP) reporting; and a third rule, wherein when the parameter TimeRestrictionConfiguration is set to Configured and based on satisfying the first rule, the temporal position is determined such that a last time unit of the $(N+1)T_s$ consecutive time units is before the time unit for when the wireless communication device is trigger for TDCP reporting, and further, the temporal interval between the last time unit of the $(N+1)T_s$ consecutive time units and the time unit for when the wireless communication device is trigger for TDCP reporting is less than D time units.

20. The method of solutions 15 and 19, wherein the wireless communication device transmits the amplitudes, phases and real parts of the channel correlations in an ascending order of the corresponding lags; and wherein when the parameter PhaseReportConfiguration of the first parameter group is set to Configured, the wireless communication device transmits in the order of the amplitudes and the phases of the channel correlations.

21. The method of solution 8, wherein the doppler-domain property contains at least one of: a differential doppler shift relative to a reference Doppler shift; or a doppler spread.

22. The method of solution 21, wherein the wireless communication device determines a number of differential doppler shifts; and wherein the number of differential doppler shifts associate with the parameter K−1 in the third group.

23. The method of solution 22, wherein the wireless communication device determines the differential Doppler shifts according to the following expression: $\Delta f_{d,k}=f_{d,k}-f_{d,ref}$, for k=2, 3, . . . K; wherein $f_{d,k}$ is the doppler shift corresponding to a kth maximum point in a doppler spectrum, and $f_{d,ref}$ is a reference doppler shift.

24. The method of solution 23, wherein the wireless communication device determines the reference doppler shift to be a doppler shift corresponds to a maximum point in the doppler spectrum.

25. The method of solution 24, wherein the wireless communication device determines the doppler spectrum by a RS symbol within L consecutive RS periods; and wherein parameter L is part of the third parameter group.

26. The method of solution 25, where the wireless communication device determines a temporal position of the L consecutive RS periods according to the parameters TimeRestrictionConfiguration and D of the third parameter group; wherein when the parameter TimeRestrictionConfiguration is set to notConfigured, the temporal position is determined such that a last time unit in the L consecutive RS periods is nearest before the time unit for when the wireless communication device is triggered for CSI reporting; and wherein when the parameter TimeRestrictionConfiguration is set to Configured, the temporal position is determined such that a last time unit in the L consecutive RS periods is before the time unit for when the wireless communication device is triggered for CSI reporting, and further the temporal interval between the last time unit in the L RS periods and the time unit for when the wireless communication device is triggered for CSI reporting is less than D time units.

27. The method of solution 26, where the wireless communication device transmits the number of differential doppler shifts in a unit that is determined according to the following expression: unit=$1/(L\cdot O\cdot T_{RS})$; wherein L and O are parts of the third parameter group.

28. The method of solution 27, where the wireless communication device transmits the differential Doppler shifts $\Delta f_{d,k}$, k=2, 3, . . . , K in an ascending order of an index k.

29. The method of solution 21, where the wireless communication device determines the doppler spread as a difference between doppler shifts corresponding to two points in a doppler spectrum.

30. The method of solution 29, wherein the wireless communication device determines the doppler spectrum by a RS symbol within L consecutive RS periods; and wherein parameter L is part of the fourth parameter group.

31. The method of solution 30, where the wireless communication device determines a temporal position of the L consecutive RS periods according to the parameters TimeRestrictionConfiguration and D of the fourth parameter group; wherein when the parameter TimeRestrictionConfiguration is set to notConfigured, the temporal position is determined such that a last time unit in the L consecutive RS periods is nearest before the time unit for when the wireless communication device is triggered for CSI reporting; and wherein when the parameter TimeRestrictionConfiguration is set to Configured, the temporal position is determined such that a last time unit in the L consecutive RS periods is before the time unit for when the wireless communication device is triggered for CSI reporting, and further the temporal interval between the last time unit in the L RS periods and the time unit for when the wireless communication device is triggered for CSI reporting is less than D time units.

32. The method of solution 31, where the wireless communication device transmits the number of differential doppler shifts in a unit that is determined according to the following expression: unit=$1/(L\cdot O\cdot T_{RS})$; wherein L and O are parts of the fourth parameter group.

33. A method of wireless communication, as disclosed in FIG. 5: including transmitting, to a wireless communication device, a reference signal (RS) (502); transmitting, to the wireless communication device, a channel state information (CSI) reporting configuration signaling (504); determining, by the wireless communication device, according to the RS and the CSI reporting configuration signaling (506); and receiving, from the wireless communication device, by a network device, a CSI according to the CSI reporting configuration signaling (508). Additional details and examples are discussed with respect to embodiments 0 & 1 and FIGS. 1 & 2 and solutions 2 to 32.

34. A communication apparatus comprising a processor configured to implement a method recited in any one or more of solutions 1 to 33.

35. A computer readable medium having code stored thereon, the code, when executed, causing a processor to implement a method recited in any one or more of solutions 1 to 33.

Figure 6:
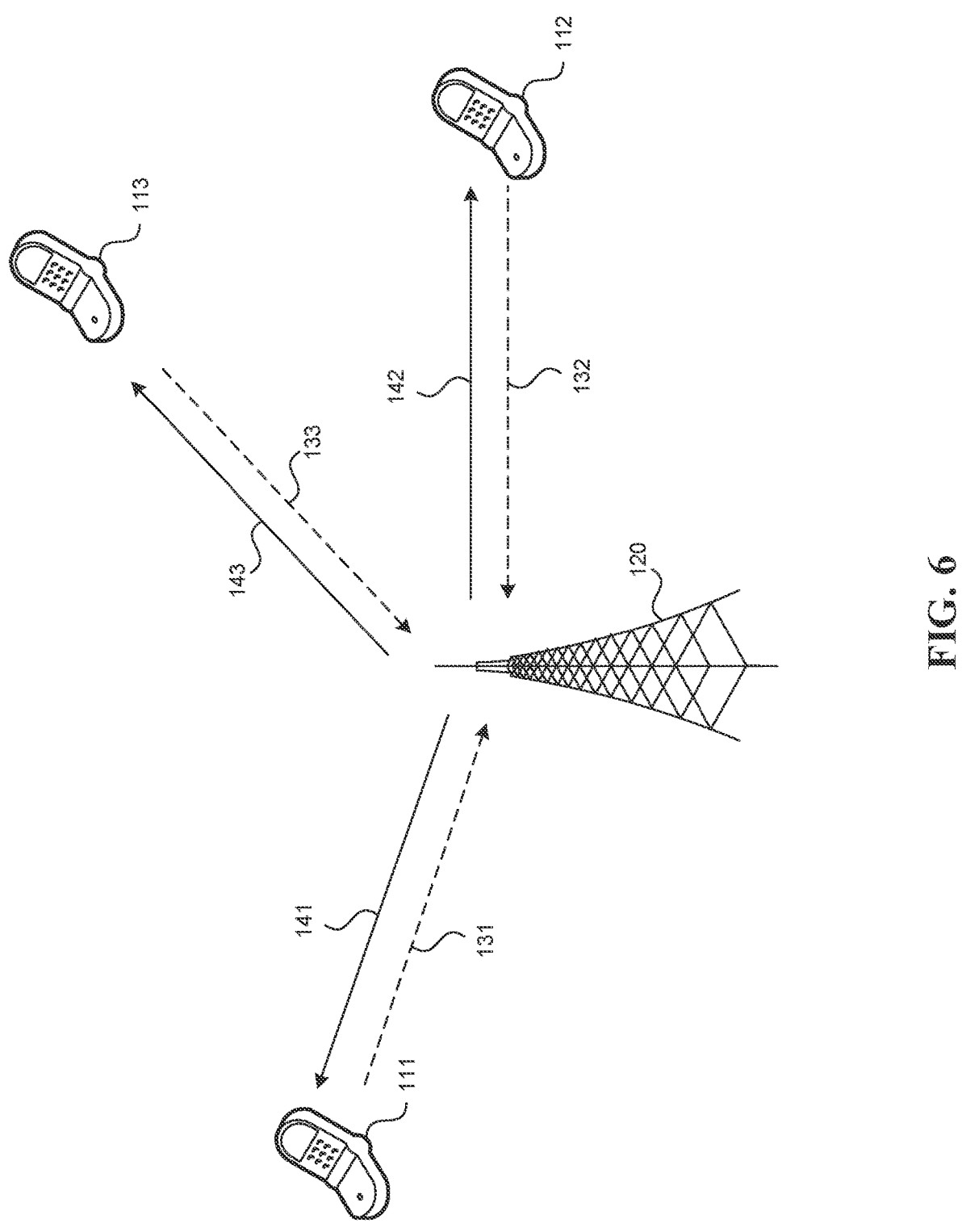
FIG. 6 is a block diagram example of a wireless communication system.

FIG. 6 shows an example of a wireless communication system (e.g., a long term evolution (LTE), 5G or NR cellular network) that includes a BS 120 and one or more user equipment (the wireless communication device) 111, 112 and 113. In some embodiments, the uplink transmissions (131, 132, 133) can include uplink control information (UCI), higher layer signaling (e.g., the wireless communication device assistance information or the wireless communication device capability), or uplink information. In some embodiments, the downlink transmissions (141, 142, 143) can include DCI or high layer signaling or downlink information. The wireless communication device may be, for example, a smartphone, a tablet, a mobile computer, a machine to machine (M2M) device, a terminal, a mobile device, an Internet of Things (IoT) device, and so on.

Figure 7:
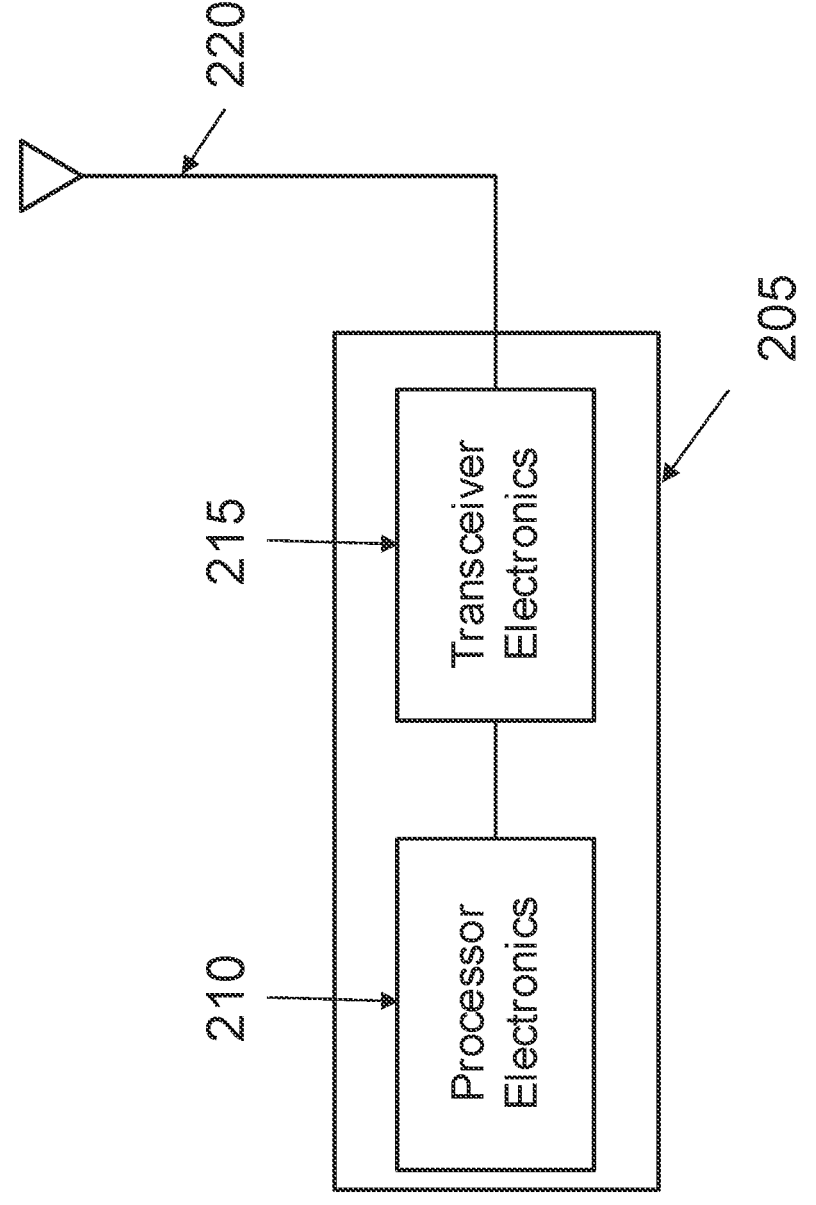
FIG. 7 is a flowchart of an example method of wireless communication.

FIG. 7 is a block diagram representation of a portion of an apparatus, in accordance with some embodiments of the presently disclosed technology. An apparatus 205 such as a network device or a base station or a wireless device (or the wireless communication device), can include processor electronics 210 such as a microprocessor that implements one or more of the techniques presented in this document. The apparatus 205 can include transceiver electronics 215 to send and/or receive wireless signals over one or more communication interfaces such as antenna(s) 220. The apparatus 205 can include other communication interfaces for transmitting and receiving data. Apparatus 205 can include one or more memories (not explicitly shown) configured to store information such as data and/or instructions. In some implementations, the processor electronics 210 can include at least a portion of the transceiver electronics 215. In some embodiments, at least some of the disclosed techniques, modules or functions are implemented using the apparatus 205.

Some of the embodiments described herein are described in the general context of methods or processes, which may be implemented in one embodiment by a computer program product, embodied in a computer-readable medium, including computer-executable instructions, such as program code, executed by computers in networked environments. A computer-readable medium may include removable and non-removable storage devices including, but not limited to, Read Only Memory (ROM), Random Access Memory (RAM), compact discs (CDs), digital versatile discs (DVD), etc. Therefore, the computer-readable media can include a non-transitory storage media. Generally, program modules may include routines, programs, objects, components, data structures, etc. that perform particular tasks or implement particular abstract data types. Computer- or processor-executable instructions, associated data structures, and program modules represent examples of program code for executing steps of the methods disclosed herein. The particular sequence of such executable instructions or associated data structures represents examples of corresponding acts for implementing the functions described in such steps or processes.

Some of the disclosed embodiments can be implemented as devices or modules using hardware circuits, software, or combinations thereof. For example, a hardware circuit implementation can include discrete analog and/or digital components that are, for example, integrated as part of a printed circuit board. Alternatively, or additionally, the disclosed components or modules can be implemented as an Application Specific Integrated Circuit (ASIC) and/or as a Field Programmable Gate Array (FPGA) device. Some implementations may additionally or alternatively include a digital signal processor (DSP) that is a specialized microprocessor with an architecture optimized for the operational needs of digital signal processing associated with the disclosed functionalities of this application. Similarly, the various components or sub-components within each module may be implemented in software, hardware or firmware. The connectivity between the modules and/or components within the modules may be provided using any one of the connectivity methods and media that is known in the art, including, but not limited to, communications over the Internet, wired, or wireless networks using the appropriate protocols.

While this document contains many specifics, these should not be construed as limitations on the scope of an invention that is claimed or of what may be claimed, but rather as descriptions of features specific to particular embodiments. Certain features that are described in this document in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or a variation of a sub-combination. Similarly, while operations are depicted in the drawings in a particular order, this should not be understood as requiring that such operations be performed in the particular order shown or in sequential order, or that all illustrated operations be performed, to achieve desirable results.

Only a few implementations and examples are described, and other implementations, enhancements, and variations can be made based on what is described and illustrated in this document.

The invention claimed is:

1. A method of wireless communication, comprising:

receiving, by a wireless communication device, a reference signal (RS);

receiving a channel state information (CSI) reporting configuration signaling that includes:

a parameter PhaseReportConfiguration set to Configured or notConfigured, a parameter N that is indicative of a number of amplitudes of a channel correlation and is an integer greater than or equal to 1, and a parameter M that is indicative of a number of phases of the channel correlation and is equal to the parameter N;

determining, according to the RS and the CSI reporting configuration signaling, a CSI; and transmitting, to a network device, the CSI according to the CSI reporting configuration signaling.

2. The method of claim 1, wherein the RS comprises a CSI-RS.

3. The method of claim 1, wherein the wireless communication device determines the CSI according to the CSI reporting configuration signaling, and wherein the CSI comprises a time-domain property.

4. The method of claim 3, wherein:

upon the parameter PhaseReportConfiguration being set to notConfigured, the time-domain property comprises one or more amplitudes of the channel correlation, wherein a number of the one or more amplitudes is associated with the parameter N; and upon the parameter PhaseReportConfiguration being set to Configured, the time-domain property comprises the one or more amplitudes and one or more phases of the channel correlation, wherein a number of the one or more amplitudes and a number of the one or more phases is associated with the parameter N or the parameter M, respectively.

5. A method of wireless communication, comprising:

transmitting, by a network device to a wireless communication device, a reference signal (RS);

transmitting a channel state information (CSI) reporting configuration signaling that includes:

a parameter PhaseReportConfiguration set to Configured or notConfigured, a parameter N that is indicative of a number of amplitudes of a channel correlation and is an integer greater than or equal to 1, and a parameter M that is indicative of a number of phases of the channel correlation and is equal to the parameter N; and receiving, from the wireless communication device, a CSI determined based on the RS and the CSI reporting configuration signaling.

6. An apparatus for wireless communication, implemented at a wireless communication device, the apparatus comprising:

at least one processor configured to:

receive a reference signal (RS);

receive a channel state information (CSI) reporting configuration signaling that includes:

a parameter PhaseReportConfiguration set to Configured or notConfigured,

a parameter N that is indicative of a number of amplitudes of a channel correlation and is an integer greater than or equal to 1, and a parameter M that is indicative of a number of phases of the channel correlation and is equal to the parameter N;

determine, based on the RS and the CSI reporting configuration signaling, a CSI; and transmit, to a network device, the CSI according to the CSI reporting configuration signaling.

7. The apparatus of claim 6, wherein the RS comprises a CSI-RS.

8. An apparatus for wireless communication, implemented at a network device, the apparatus comprising:

at least one processor configured to cause the apparatus to:

transmit, to a wireless communication device, a reference signal (RS);

transmit a channel state information (CSI) reporting configuration signaling that includes:

a parameter PhaseReportConfiguration set to Configured or notConfigured, a parameter N that is indicative of a number of amplitudes of a channel correlation and is an integer greater than or equal to 1, and a parameter M that is indicative of a number of phases of the channel correlation and is equal to the parameter N; and receive, from the wireless communication device, a CSI determined based on the RS and the CSI reporting configuration signaling.

9. The apparatus of claim 6, wherein the wireless communication device determines the CSI according to the CSI reporting configuration signaling, and wherein the CSI comprises a time-domain property.

10. The apparatus of claim 9, wherein:

upon the parameter PhaseReportConfiguration being set to notConfigured, the time-domain property comprises one or more amplitudes of the channel correlation, wherein a number of the one or more amplitudes is associated with the parameter N; and upon the parameter PhaseReportConfiguration being set to Configured, the time-domain property comprises the one or more amplitudes and one or more phases of the channel correlation, wherein a number of the one or more amplitudes and a number of the one or more phases is associated with the parameter N or the parameter M.

11. The method of claim 5, wherein the RS comprises a CSI-RS.

12. The method of claim 5, wherein the wireless communication device determines the CSI according to the CSI reporting configuration signaling, and wherein the CSI comprises a time-domain property.

13. The method of claim 12, wherein:

upon the parameter PhaseReportConfiguration being set to notConfigured, the time-domain property comprises one or more amplitudes of the channel correlation, wherein a number of the one or more amplitudes is associated with the parameter N; and upon the parameter PhaseReportConfiguration being set to Configured, the time-domain property comprises the one or more amplitudes and one or more phases of the channel correlation, wherein a number of the one or more amplitudes and a number of the one or more phases is associated with the parameter N or the parameter M.

14. The apparatus of claim 8, wherein the RS comprises a CSI-RS.

15. The apparatus of claim 8, wherein the wireless communication device determines the CSI according to the CSI reporting configuration signaling, and wherein the CSI comprises a time-domain property.

16. The apparatus of claim 15, wherein:

upon the parameter PhaseReportConfiguration being set to notConfigured, the time-domain property comprises one or more amplitudes of the channel correlation, wherein a number of the one or more amplitudes is associated with the parameter N; and upon the parameter PhaseReportConfiguration being set to Configured, the time-domain property comprises the one or more amplitudes and one or more phases of the channel correlation, wherein a number of the one or more amplitudes and a number of the one or more phases is associated with the parameter N or the parameter M.

* * * * *